United States Patent [19]
Garcea

[11] 3,804,113
[45] Apr. 16, 1974

[54] AUTOMATIC NON-RETURN VALVE
[75] Inventor: Giampaolo Garcea, Milan, Italy
[73] Assignee: Alfa Romeo S.p.A., Milan, Italy
[22] Filed: June 21, 1971
[21] Appl. No.: 154,885

[52] U.S. Cl.................. 137/496, 137/508, 137/525
[51] Int. Cl............................................ F16k 15/14
[58] Field of Search.................... 137/508, 525, 496

[56] References Cited
UNITED STATES PATENTS
| | | | |
|---|---|---|---|
| 3,500,722 | 3/1970 | Franz | 137/496 X |
| 3,265,084 | 8/1966 | Wagner | 137/508 |
| 3,073,339 | 1/1963 | Stelzer | 137/525 X |
| 3,354,902 | 11/1967 | Obermaier | 137/525 X |
| 3,580,273 | 5/1971 | Schwarz | 137/493.4 |

Primary Examiner—Harold W. Weakley
Attorney, Agent, or Firm—Holman & Stern

[57] ABSTRACT

A non-return valve for fluids in which a yieldable diaphragm constitutes the movable wall of a resiliently preloaded valve. Elastomers and rubber are the materials which are preferred for the movable wall of the valve, with the valve body being made also of a molded plastic material. An initial deformation is imparted to the resilient movable wall so as to have a preload available for the valve.

1 Claim, 4 Drawing Figures

AUTOMATIC NON-RETURN VALVE

BACKGROUND OF THE INVENTION

This invention relates to automatic non-return valves.

PRIOR ART

Automatic, non-return valves are known, which, when they are inserted in a fluid duct, allow the fluid to flow in one direction only. Generally, in these devices, the plug member is urged by a resilient loading element in contact with the sealing seat. Closure is thus obtained when no other forces are active upon the plug member. Closure is experienced when the fluid shows a tendency towards being shifted in a direction away of the direction of the opening stroke of the plug member: the pressure differential which originates the tendency of the fluid towards being shifted, is active, in this case, upon the plug member, so that the latter is compressed against its seating not only by the resilient load aforesaid, but also by a force whose magnitude is the product of the pressure differential by the area of the plug member. When, conversely, the fluid has a tendency towards being shifted concurrently with the opening stroke of the plug member, two cases, in the main, may occur, viz.: a) the force due to the pressure differential which is active upon the plug member is less than the resilient load as applied to the plug member as itself (if so, the valve remains closed and the fluid does not flow); b) the force due to the pressure differential is greater than the resilient load (if so, the valve is opened and the fluid can flow).

In the case, which frequently occurs, in which a perfect seal is desired when the valve is closed, it is apparent that the specific pressure along the sealing edge of the plug member must exceed a certain value (which is a function of the degree of surface finish and the yieldability of the two contacting members, viz. the plug member and its seating. Thus, the resilient load as applied to the plug member, upon which the specific pressure aforesaid depends, must also exceed a predetermined magnitude. From these circumstances, it stems that the pressure differential which is required for opening the valve may be too high, in the conventional valves, than what is required in the light functional considerations.

OBJECTS AND SUMMARY OF THE INVENTION

The object of the present invention is to provide an automatic, non-return valve which allows a fluid to flow in a single direction (to be defined as "forward direction") even for very slight values of the pressure differential, with the reversed flow ("return") being positively prevented both for very slight values of a pressure differential having a sign opposite to the former, and, for a still stronger reason, for higher values of said pressure differential. An additional object is to achieve these properties with a valve having a simpler structure and thus economically acceptable.

The functional features of a conventional valve can be compared with those of the valve the subject of the present specification, with the aid of the accompanying diagrammatic drawings which illustrate the basic principle of the subject valve.

DETAILED DESCRIPTION OF THE INVENTION

Figure 1:
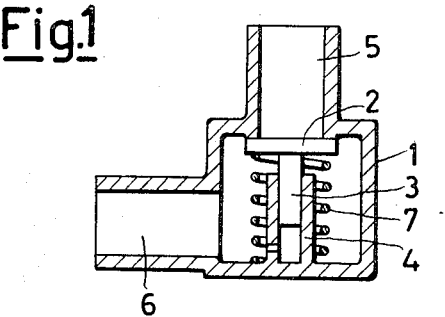
FIG. 1 is a view partly in cross section and partly in elevation of a convention non-return valve.

In FIG. 1, which shows a diagrammatic example of a conventional non-return valve, numeral 1 indicates the valve body or casing, 2 is a valve proper (or plug member) which is integral with a stem 3, slidably mounted in a guide 4, with the latter being integral with the body 1. Numeral 5 indicates a fluid inlet duct, for the fluid intended to flow through the automatic valve, and 6 is an outlet duct for the same fluid. By virtue of a spring 7, which keeps the plug member 2 in the closed position (thus ensuring an adequate specific pressure along the peripheral contact surface between the member 2 and the casing 1), the fluid cannot flow in the opposite direction, that is, from outlet 6 to inlet 5. It is apparent that, by indicating with $P_s$ the specific pressure per unit of peripheral length which is necessary (at the edge of the member 2 which contacts the body 1) for ensuring the tight seal, the elastic preload of the spring 7 must be $C = \pi .d.P_s$ ($d$ being the average diameter of the contact edge). It is likewise apparent that the fluid can flow from the inlet 5 to the outlet 6 only if a positive pressure differential P, acting on the plug member 2, is attained, such as to overcome the preload C. The following relationship is applicable:

$$\Delta P = 4 P_s/d$$

Figure 2:
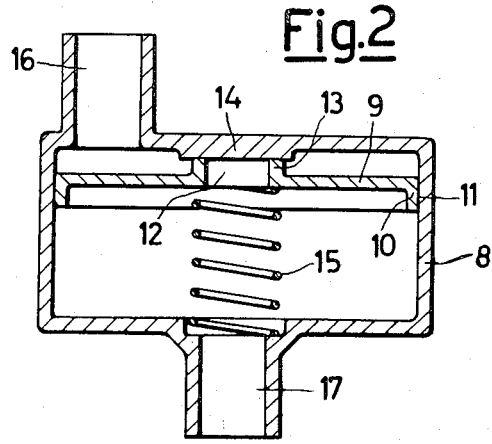
FIG. 2 is a view partly in cross section and partly in elevation of a non-return valve according to the invention.

In FIG. 2, conversely, which relates to a diagrammatic example of a non return valve according to the present invention, numeral 8 indicates a valve body or casing, 9 is a movable wall whose edge 10 has a cylindrical surface (coaxial with the cylinder 11) which slides in a sealtight manner along the inner wall, also cylindrical, of the casing 8. A central bore 12 extends through the movable wall, and has a peripheral seal 13 which is kept into contact with a member 14 (which is part of the casing 8) by virtue of a resilient preload C of the spring 15 (when no other forces are active on the movable wall 9). To ensure the tight seal of the closed valve, also in this case, a specific pressure $P_s$ per length unit on the contact edge is required, so that the elastic preload should be, also in this case, $C = \pi .d.P_s$. A fluid will be allowed to flow from an inlet 16 to the outlet 17 as soon as a pressure differential $P'$, active on the movable wall (whose outside diameter is D), such as to overcome the preload C, is attained. Thus, in the case of FIG. 2, the relationship:

$$\Delta P' = 4 P_s d/D^2 - d^2$$

is valid.
By assuming $K = D/d$, the relationship becomes:

$\Delta P' = 4\, P_s/d \cdot 1/K^2 - 1$ The comparison between the $\Delta P$ value (relative to the case of FIG. 1) and the $\Delta P'$ value (relative to FIG. 2) can thus be given by their ratio:

$$\Delta P'/\Delta P = 1/K^2 - 1$$

This relationship shows that, starting from a certain value of the D/d ratio, the second term is less than the unity, and becomes the smaller as the ratio D/d is increased. For example, for values of D/d as high as 2, 3, 4, the pressure differential P' which is required for opening the valve shown in FIG. 2 is ⅓, ⅛, 1/15, respectively, of the pressure differential P which is necessary to open the conventional valve of FIG. 1: this fact can be advantageous in many cases in connection with the functional requirements of the device or the circuit in which the valve is used.

Of course, a valve based on the concept explained above is difficult to manufacture in practice according to the embodiment of FIG. 2, for example, on account of the difficulty of obtaining a satisfactory sliding seal, without friction, between the periphery of the movable wall and the valve body.

It has thus been envisaged to embody the movable wall in such a way that at least its peripheral portion may behave like a yielding diaphragm. By fastening to the body the yielding outer edge of the wall, the wall movement can take place in a frictionless fashion and with an absolutely tight seal. To this end, the entire movable wall can be made as an entity of an elastomer or rubber of an appropriate hardness, taking care that the several thicknesses are properly selected in connection with the necessity of having stiffness in certain points and yieldability in others. Such an embodiment permits also to obtain without difficulty a sealing edge having a correct yieldability about the central bore of the wall. With a wall made of an elastomer or rubber and for not too high values of the pressure, also the elastic preload can be obtained by elastic deformation of the wall as the latter is assembled, so that the metallic spring is no longer necessary and the cost of the valve is further reduced.

Still in the case of not too high pressures, the valve body can be made of a plastic material, by molding. In addition, the matching of the valve body and the movable wall can be obtained by merely forcibly inserting the two component parts into one another on account of the particular yieldability of the elastomer or rubber which forms the movable wall.

Figure 3:
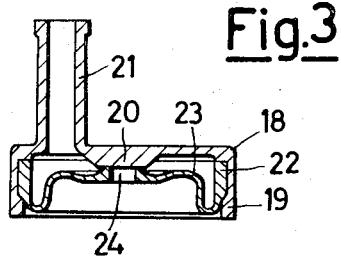
FIG. 3 is a view partly in cross section and partly in elevation of a non-return valve according to the present invention for allowing the fluid flowing therethrough from a reservoir of a circuit to be dumped outside, and, FIG. 4 is a planned view of the valve illustrated in FIG. 3.
Figure 4:
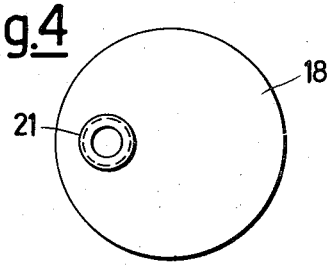

These constructional features, which are a part of the present invention, are shown in the accompanying FIG. 3, which illustrates a particular type of non-return valve, which is such as to allow the fluid flowing therethrough from a reservoir of a circuit to be dumped outside, rather than into another reservoir or a circuit. Obviously, this takes place, in the light of what has been said above for a valve of the "general purpose" type, with internal overpressures which are very slight as compared with that obtaining outside, the inflow of air from the outside into the reservoir or circuit is inhibited. The valve of FIG. 3 comprises only two component parts: a valve body 18 of a molded plastic material, as a single piece provided with a cylindrical edge 19 and an abutment 20. The abutment 20 is integral with a tube 21 (for connection to the reservoir or circuit from which the fluid should be allowed to escape). In the interior of the edge 19 a circular edge 22 of a movable wall 23 is forcibly inserted with, the wall having a bore 24. The movable wall is adequately thin and pliable in correspondence with its peripheral rim close to the edge 22. As aforesaid, the edge 22 and the wall 23 are a single piece of an elastomer or rubber.

What is claimed is:

1. A check valve for ensuring both the flow of a fluid in one direction under a very slight pressure differentials and simultaneously a hermetic seal in the opposite direction under very slight pressure differentials, comprising an outer casing of rigid moldable material, a valve member of elastomeric moldable material, said valve member including a thin mobile wall having a central port and enlarged stiffened outer and inner edges, the wall having a first annular portion of undulated cross section adjacent the inner edge, and a second substantially annular portion connecting the first annular portion with the outer edge, said second portion being shaped to form a loop having its convexity outwardly facing with respect to the valve member, said casing being provided with an inner circumferential groove in which the outer edge of the valve member is seated, said casing having an inner wall provided with an abutment for the inner edge of the mobile wall of the valve member to seat against, the valve member being mounted in the casing such that an elastic pre-load causes the inner and outer edges of the mobile wall to adhere tightly to the casing surfaces, the casing having a hole providing communication between the cavity provided between the mobile wall of the valve member and the casing and the space from which the fluid is required to be discharged.

* * * * *